United States Patent
Lee et al.

(10) Patent No.: US 8,786,230 B2
(45) Date of Patent: Jul. 22, 2014

(54) APPARATUS AND METHOD OF ESTIMATING INDUCTANCE OF PERMANENT MAGNET SYNCHRONOUS MOTOR

(75) Inventors: Dong Hwan Lee, Seoul (KR); Young Jae Park, Yongin-si (KR); Yong Soon Park, Cheongju-si (KR); Seung Ki Sul, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 382 days.

(21) Appl. No.: 13/137,309

(22) Filed: Aug. 4, 2011

(65) Prior Publication Data
US 2012/0194113 A1   Aug. 2, 2012

(30) Foreign Application Priority Data
Feb. 1, 2011   (KR) .................. 10-2011-0009973

(51) Int. Cl.
H02P 6/18   (2006.01)

(52) U.S. Cl.
USPC ................. 318/400.32; 318/400.33

(58) Field of Classification Search
USPC ...................... 318/400.32, 400.33
See application file for complete search history.

(56) References Cited

U.S. PATENT DOCUMENTS

| | | | |
|---|---|---|---|
| 6,351,094 B1 * | 2/2002 | Green | 318/701 |
| 6,396,229 B1 | 5/2002 | Sakamoto et al. | |
| 6,492,788 B1 * | 12/2002 | Agirman et al. | 318/700 |
| 6,552,509 B2 * | 4/2003 | Veltman | 318/807 |
| 6,763,622 B2 * | 7/2004 | Schulz et al. | 318/700 |
| 7,034,497 B2 * | 4/2006 | Markunas et al. | 318/400.33 |
| 7,759,897 B2 * | 7/2010 | Piippo | 318/700 |
| 8,659,247 B2 * | 2/2014 | Fricker | 318/400.04 |

* cited by examiner

*Primary Examiner* — Bentsu Ro
(74) *Attorney, Agent, or Firm* — Staas & Halsey LLP

(57) ABSTRACT

A method of estimating inductance of a permanent magnet synchronous motor (PMSM) includes injecting a signal having a frequency differing from an operating frequency of the PMSM into the PMSM during sensorless operation, sensing magnitudes of current responses to the injected signal, and estimating an inductance value at which the magnitude of the sensed current response is minimal to be an actual inductance value of the PMSM, thereby estimating inductance used in the PMSM regardless of position estimation error of the PMSM and thus more accurately and reliably estimating inductance of the PMSM.

20 Claims, 8 Drawing Sheets

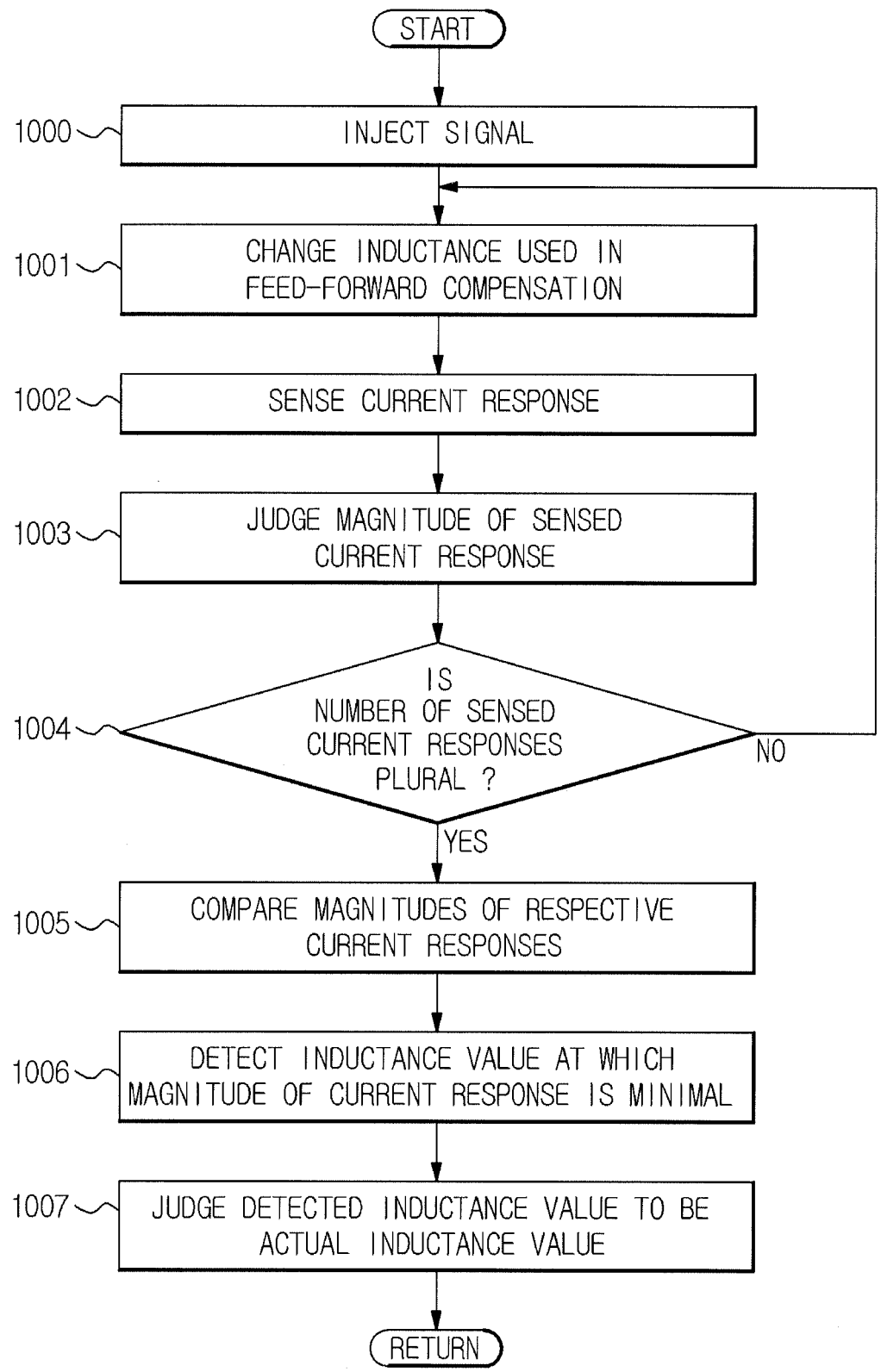

APPARATUS AND METHOD OF ESTIMATING INDUCTANCE OF PERMANENT MAGNET SYNCHRONOUS MOTOR

CROSS-REFERENCE TO RELATED APPLICATIONS

This application claims the benefit of Korean Patent Application No. 2011-0009973, filed on Feb. 1, 2011 in the Korean Intellectual Property Office, the disclosure of which is incorporated herein by reference.

BACKGROUND

1. Field

Embodiments of the present disclosure relate to an apparatus and method of estimating inductance of a permanent magnet synchronous motor (PMSM) which estimates parameters of the PMSM during sensorless operation.

2. Description of the Related Art

Most air conditioning apparatuses sold for home or industrial use employ electric motors to compress a refrigerant. Recently, a permanent magnet synchronous motor (PMSM) having excellent energy efficiency and output density has been proposed as an electric motor to drive a compressor in an air conditioning apparatus.

In order to effectively operate the PMSM, a vector control technique based on magnetic flux may be applied. Vector control has a high requirement of a position sensor to acquire a reference magnetic flux, but the position sensor has low reliability under the condition of a compressor which is sealed and raised to a high temperature and cost rise due to installation of the position sensor provides a burden to a manufacturer. Therefore, a sensorless control technique to drive a PMSM for compressors is widely applied. In order to implement sensorless control of a compressor, a sensorless technique using a voltage equation is generally used.

In the PMSM used in the compressor, designed values of parameters are present. However, the designed values differ from actual parameters due to environmental variation, i.e., change of natural phenomena which are relatively monotonously raised or lowered for a long time, manufacturing tolerance and operating environmental variation. In the sensorless technique using a voltage equation, parameters of the motor are used during a process of detecting the position of the magnetic flux of a rotor, and thus errors of the parameters of the motor used in sensorless control affect position estimation performance. That is, the errors in the parameters may lower control performance of the motor, and thus acquisition of correct parameters is important in sensorless operation.

The voltage equation used in sensorless operation is an equation between a d-axis coinciding with the magnetic flux of permanent magnets and a q-axis perpendicular to the d-axis. Therefore, in order to obtain parameters of the voltage equation, the position of the actual magnetic flux of the rotor needs to be first detected.

However, the position of the d-axis estimated through sensorless control under the condition that the correct parameters are not known, and position error of the d-axis is reflected in current error during d/q-axis conversion of phase current process and thus acts as error in estimating the parameters using the voltage equation.

Therefore, a measure to more accurately and reliably estimate parameters of a PMSM during sensorless operation may be required.

SUMMARY

Therefore, it is an aspect of the present disclosure to provide an apparatus and method of estimating inductance of a permanent magnet synchronous motor (PMSM) which more accurately and reliably estimates inductance from among parameters of the PMSM.

Additional aspects of the disclosure will be set forth in part in the description which follows and, in part, will be apparent from the description, or may be learned by practice of the disclosure.

In accordance with one aspect of the present disclosure, a method of estimating inductance of a permanent magnet synchronous motor (PMSM) includes injecting a random signal into one axis of a rotor coordinate system of the PMSM during sensorless operation, changing inductance used in control of the PMSM plural times during injection of the signal, respectively sensing current responses to the injected signal during change of inductance plural times, and detecting an inductance value based on magnitudes of the sensed current responses, and judging the detected inductance value to be an actual inductance value of the PMSM.

The injection of the random signal may include injecting a voltage signal.

The injection of the voltage signal may include injecting the voltage signal into the q-axis of the rotor coordinate system.

The sensing of the current responses may include sensing d-axis current responses to the voltage signal injected into the q-axis.

The detection of the inductance value based on the magnitudes of the sensed current responses may include comparing the magnitudes of the sensed current responses to each other and detecting an inductance value at which the magnitude of the sensed current response is minimal as a result of the comparison.

The injection of the random signal may include injecting a signal having a frequency differing from an operating frequency of the PMSM.

In accordance with another aspect of the present disclosure, a method of estimating inductance of a permanent magnet synchronous motor (PMSM) includes injecting a random signal into one axis of a rotor coordinate system of the PMSM during sensorless operation, sensing change of current response to the injected signal while changing inductance used in control of the PMSM plural times during injection of the signal, and detecting an actual inductance value of the PMSM based on the sensed change of the current response.

The injection of the random signal may include injecting a voltage signal into the q-axis of the rotor coordinate system.

The sensing of the change of the current response may include sensing change of d-axis current response to the voltage signal injected into the q-axis.

The detection of the inductance value may include detecting an inductance value used in control of the PMSM when the change of the current response is minimal and judging the detected inductance value to be the actual inductance value of the PMSM.

The injection of the random signal may include injecting a signal having a frequency differing from an operating frequency of the PMSM.

In accordance with a further aspect of the present disclosure, an apparatus of estimating inductance of a permanent magnet synchronous motor (PMSM) includes the PMSM, an inverter to drive the PMSM, a current measurement unit to measure phase current of the PMSM, and an inductance estimation unit to inject a random signal into one axis of a rotor coordinate system of the PMSM during sensorless operation and to estimate an actual inductance value of the PMSM during sensorless operation based on current responses to the injected signal.

The inductance estimation unit may inject the random signal into the axis of a rotor coordinate system of the PMSM during sensorless operation, change inductance used in control of the PMSM plural times during injection of the signal, respectively sense current responses to the injected signal during change of inductance plural times, and detect an inductance value based on magnitudes of the sensed current responses, and judge the detected inductance value to be an actual inductance value of the PMSM.

The inductance estimation unit may inject a voltage signal having a frequency differing from an operating frequency of the PMSM.

The inductance estimation unit may inject the voltage signal into the q-axis of the rotor coordinate system.

The inductance estimation unit may sense d-axis current responses to the voltage signal injected into the q-axis.

The inductance estimation unit may compare the magnitudes of the sensed current responses to each other, detect an inductance value at which the magnitude of the sensed current response is minimal as a result of the comparison, and judge the detected inductance value to be the actual inductance value of the PMSM.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 8 is a flowchart illustrating a method of estimating inductance in the apparatus in accordance with the embodiment of the present disclosure.

DETAILED DESCRIPTION

Figure 1:
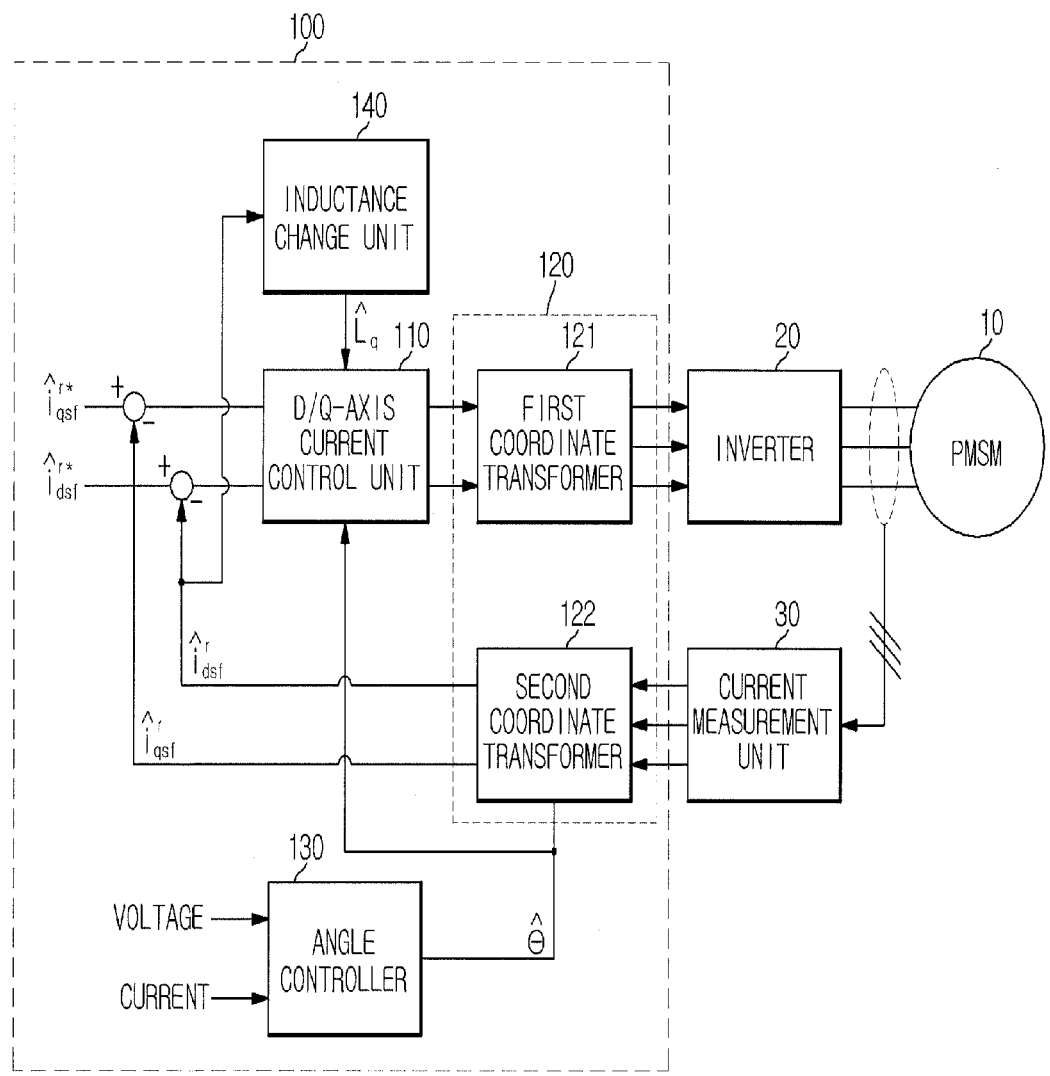
FIG. 1 is a block diagram of an apparatus of estimating inductance of a permanent magnet synchronous motor (PMSM) in accordance with one embodiment of the present disclosure.

Reference will now be made in detail to embodiments of the present disclosure, examples of which are illustrated in the accompanying drawings, wherein like reference numerals refer to like elements throughout.

In general, a position sensorless technique is classified into two types, i.e., a position sensorless method using saliency in which inductance of a winding is varied according to rotating position and a position sensorless method using back EMF in a winding of a motor.

The position sensorless method using back EMF is disadvantages in that back EMF is not generated or a magnitude of back EMF is small when a motor is stopped or operated at a low velocity and thus position estimation is difficult, but is advantageous in that the position sensorless method using back EMF is easily applied to both a motor with saliency and a motor without saliency when the motor is operated at a middle velocity or a high velocity.

Permanent magnet synchronous motors (PMSMs) are divided into a surface-mounted permanent magnet synchronous motor (SMPMSM) and an interior permanent magnet synchronous motor (IPMSM) according to attachment methods of permanent magnets provided in a rotor.

The SMPMSM in which permanent magnets are attached to the surface of a rotor does not have saliency and thus an inductance value thereof is the same regardless of position. On the other hand, in the IPMSM in which permanent magnets are mounted within a rotor, a magnitude of a linked magnetic flux is varied according to position and thus saliency occurs and an inductance value is varied according to position.

In the position sensorless method using back EMF, the position of a rotor is estimated using the following voltage equation (with reference to Equation 1) obtained by modeling operation of a PMSM.

$$\begin{bmatrix} v_{ds}^r \\ v_{qs}^r \end{bmatrix} = \begin{bmatrix} R_s & -\omega_r L_q \\ \omega_r L_d & R_s \end{bmatrix} \begin{bmatrix} i_{ds}^r \\ i_{qs}^r \end{bmatrix} + \begin{bmatrix} L_d \cdot p i_{ds}^r \\ L_q \cdot p i_{qs}^r \end{bmatrix} + \begin{bmatrix} 0 \\ \omega_r \lambda_f \end{bmatrix} \quad \text{[Equation 1]}$$

Here, ($v_{ds}^r$, $v_{qs}^r$) represents d/q-axis voltage of a rotor coordinate system, ($i_{ds}^r$, $i_{qs}^r$) represents d/q-axis current of the rotor coordinate system, $R_s$ represents phase resistance, $L_d$ represents d-axis inductance, $L_q$ represents q-axis inductance, $\lambda_f$ represents a linked magnetic flux, $\omega_r$ represents rotational velocity, p represents a differential member, and $\omega_r \lambda_f$ represents back EMF. Further, the d-axis indicates a direction of magnetic flux of permanent magnets of the rotor and the q-axis precedes the d-axis by an angle of 90 degrees in the rotational direction of the rotor.

The Equation 1 above may be applied both to SMPMSMs and IPMSMs, but application thereof is changed whether or not the inductance value is varied or not. In such a sensorless method using the voltage equation, it is assumed that accurate parameters of the motor are reflected in a model.

However, since the parameters of the PMSM are changed according to change of operating conditions of the PMSM and surrounding environments, if regular parameter values are used, there are differences between parameter values of the models and parameter values used in sensorless control and the basic assumption of the sensorless operation is violated, thus lowering operation performance of the PMSM.

In order to estimate the parameters of the PMSM, several methods, such as a least-square method and a method using an observer are used. These methods employ the voltage equation expressed by the above-described Equation 1.

The parameters of the PMSM which need to be estimated are values used in the Equation 1 above, and thus may be directly estimated using Equation 1. However, Equation 1 is satisfied only in the rotor coordinate system, thus being satisfied only assuming that the position of the rotating magnetic flux is accurately detected. Position estimation error between virtual d/q axes actually viewed from an angle to actually control the motor and the actual d/q axes is inevitably generated, and this is reflected in deviations of the parameters on the coordinate system.

Inversely, errors of the parameters of the PMSM cause a position estimation deviation of the rotating magnetic flux, as stated in Equation 2 below, in sensorless control using Equation 1.

$$\theta_d \approx \frac{(\hat{L}_q - L_q) \cdot \hat{i}_{qs}^r - \frac{\hat{R}_s - R_s}{\omega_r} \cdot \hat{i}_{ds}^r}{(L_d - L_q) \cdot \hat{i}_{ds}^r + \lambda_f} \quad \text{[Equation 2]}$$

Here, $\hat{R}_s$ is an estimated value of $R_s$ (phase resistance), $\hat{L}_q$ is an estimated value of $L_q$ (q-axis inductance), and $\theta_d$ indicating $\theta - \hat{\theta}$ is position estimation deviation, i.e., angle error.

When d/q-axis conversion is executed using an estimated angle having deviation with an actual position of the rotating magnetic flux, d-axis current and q-axis current which are recognized are estimated values also and thus are expressed as $\hat{i}_{qs}^r$ and $\hat{i}_{ds}^r$.

As stated in Equation 2, if there is error between an actual parameter of the PMSM and an estimated parameter of the PMSM, an angle $\hat{\theta}$ estimated through sensorless control has deviation with an actual angle $\theta$. If there is deviation in angle estimation, the voltage equation stated in Equation 1 is not satisfied. Sensorless operation does not have a position sensor and thus angle estimation deviation is not recognized.

Consequently, if whether or not parameters used in sensorless control are accurate are unclear, reliability and accuracy in position estimation of the rotating magnetic flux are unclear, and reliability in the method of estimating the parameters based on the voltage equation is lowered.

Therefore, in order to raise reliability in parameter estimation, a method in which priorities of the parameters of the PMSM are set to reduce errors due to the relations therebetween is used, or a new parameter estimation method which does not use the voltage equation is necessary.

In accordance with one embodiment of the present disclosure, inductance, which is one of the parameters of the PMSM operating under sensorless control, is estimated in real time without error in position estimation so as to track deviation of the parameters.

Position estimation error of the rotating magnetic flux during sensorless operation is affected by inductance error and resistance error, as stated in Equation 2. In Equation 2, if the d-axis current is controlled to be 0, the effect of the resistance error does not occur, and if the q-axis current is controlled to be 0, the effect of the inductance error does not occur.

In a PMSM which has little need for magnetic flux weakening operation and thus does not have high saliency, a burden of the q-axis current managing a load is relatively large, and thus control of the d-axis current to be 0 is easier than control of the q-axis current to be 0 when load is applied to the PMSM during operation. Therefore, elimination of the effect of the resistance on the angle estimation error is easier than elimination of the effect of the inductance on the angle estimation error during sensorless operation.

Further, since it is understood from Equation 2 that the effect of the resistance error upon angle estimation decreases as velocity increases, top priority is applied to the inductance in order to improve position estimation performance during sensorless operation using the voltage equation stated in Equation 1. Therefore, if the d-axis current is set to 0 and the angle estimation deviation which is proportional only to the inductance error is generated, when the angle estimation deviation is reduced, the inductance error may be simultaneously reduced.

In accordance with the one embodiment of the present disclosure, from among effects of parameters used in control of sensorless operation, generation of deviation between an estimated angle and an actual angle is focused and how a parameter error functions as an angle deviation will be described.

Further, in accordance with the embodiment of the present disclosure, with analysis using a sensorless method in which output of a d-axis current controller is used as error information, an effect of error of inductance, used in feed-forward compensation (feedback compensation) of the d-axis current controller, on the estimated angle deviation is induced with Equations, thereby indicating that inductance functions as the main factor to generate respective deviations.

Further, in accordance with the embodiment of the present disclosure, in order to detect respective errors due to inductance error, for example, a method in which a signal having a frequency differing from an operating frequency of the PMSM is injected is proposed. In consideration of the relation between current controller output and feedback current, tendency of current response to the injected signal is deduced through equations.

Moreover, in accordance with the embodiment of the present disclosure, a method of estimating inductance by finding a point where a magnitude of current, the signal of which is processed, is minimal is proposed. Such a proposed method employs signal analysis unrelated to phase delay of a filter and thus increases the attenuation rate of the filter, thereby effectively eliminating pulsating noise and thus improving the accuracy in error detection.

Figure 2:
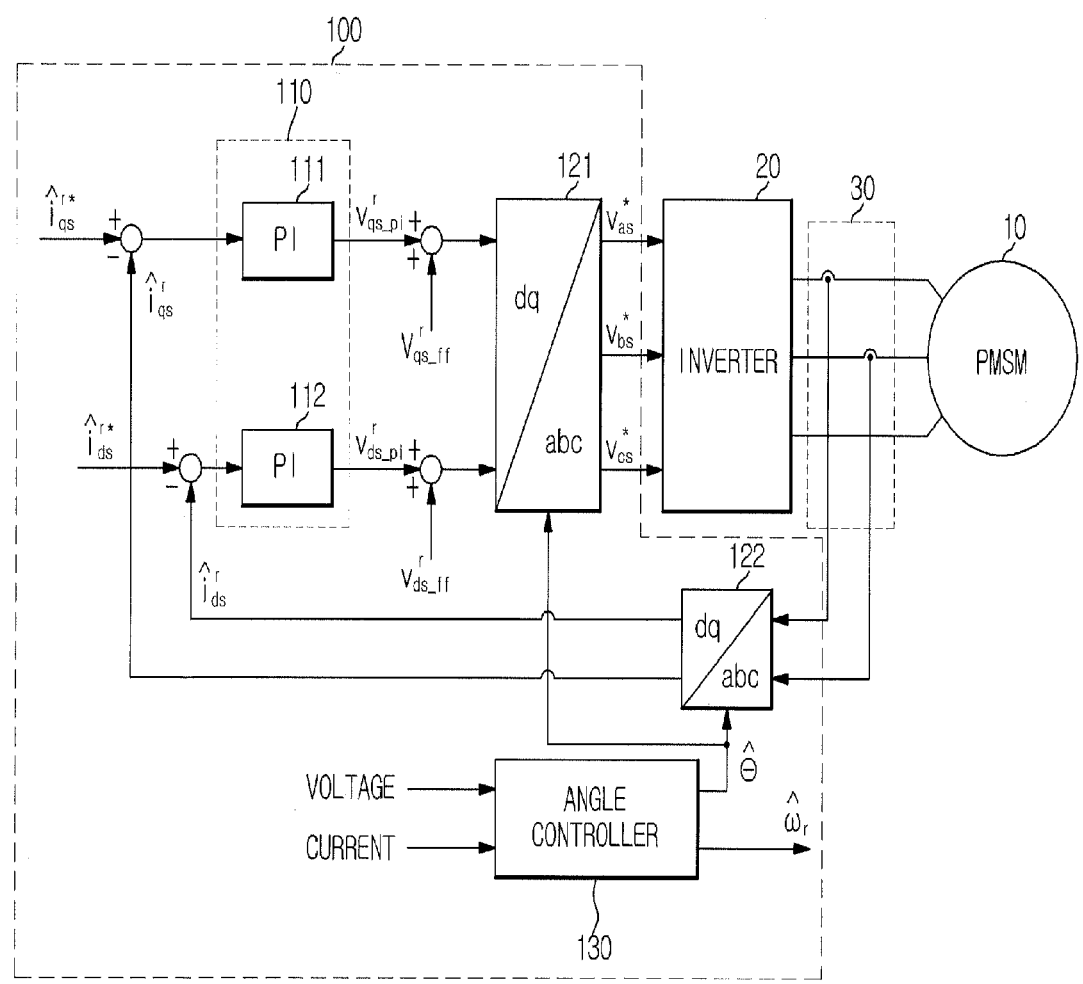
FIG. 2 is a block diagram illustrating sensorless control in the apparatus in accordance with the embodiment of the present disclosure.

FIG. 1 is a block diagram of an apparatus of estimating inductance of a permanent magnet synchronous motor (PMSM) in accordance with one embodiment of the present disclosure. FIG. 2 is a block diagram illustrating sensorless control in the apparatus of estimating inductance of the PMSM in accordance with the embodiment of the present disclosure.

As shown in FIG. 1, the apparatus of estimating inductance of the PMSM includes a PMSM 10, an inverter 20, a current measurement unit 30 and an inductance estimation unit 100.

The PMSM 10 is a motor, a magnetic flux of which is regular by means of permanent magnets. The PMSM 10 may be classified into a surface-mounted permanent magnet synchronous motor (SMPMSM) or an interior permanent magnet synchronous motor (IPMSM) according to a method of attaching the permanent magnets to a rotor.

In the SMPMSM, the permanent magnets are attached to the surface of the rotor. Therefore, the SMPMSM does not have saliency which is a difference between d-axis inductance and q-axis inductance of a rotor coordinate system, and thus an inductance value is the same regardless of position.

On the other hand, in the IPMSM, the permanent magnets are mounted within the rotor. Therefore, in the PMSM, a magnitude of linked magnetic flux is varied according to position, and thus saliency occurs and an inductance value is varied according to position.

The inverter 20 drives the PMSM 10.

The current measurement unit 30 measures phase current flowing in the PMSM 10.

The inductance estimation unit 100 executes sensorless control of the PMSM 10 and estimates inductance used in control of the PMSM 10 in real time, simultaneously. As will be described later, the inductance estimation unit 100, together with execution of sensorless control of the PMSM 10, injects a signal having a frequency differing from an operating frequency of the PMSM 10, senses a magnitude of current response to the injected signal, and estimates inductance, used in control of the PMSM 10 when the magnitude of current response is minimal, to be actual inductance of the PMSM 10. Therefore, inductance used in the PMSM 10 may be estimated in real time regardless of position estimation error of the PMSM 10, and thus inductance may be more accurately estimated and a result of inductance estimation may be more reliably obtained.

For this purpose, the inductance estimation unit 100 includes a d/q-axis current control unit 110, a coordinate transformation unit 120, an angle controller 130 and an inductance change unit 140.

The d/q-axis current control unit 110 controls d-axis and q-axis currents of the rotor coordinate system of the PMSM 10 to be set to current command values ($\hat{i}_{dsf}^{r*}$, $\hat{i}_{qsf}^{r*}$). The d/q-axis current control unit 110 includes a q-axis proportional integral (PI) controller 111 and a d-axis proportional integral (PI) controller 112. Output voltages of the d/q-axis current control unit 110, serving as input of the inverter 20, are respectively the sums of outputs ($v_{ds\_pi}^r$, $v_{qs\_pi}^r$) and feed-forward compensation components ($v_{ds\_ff}^r$, $v_{qs\_ff}^r$) of the q-axis PI controller 111 and the d-axis PI controller 112.

The coordinate transformation unit 120 executes coordinate transformation of 3 phases into 2 phases and coordinate transformation of 2 phases into 3 phases. The coordinate transformation unit 120 includes a first coordinate transformer 121 executing coordinate transformation of 3 phases into 2 phases and a second coordinate transformer 122 executing coordinate transformation of 2 phases into 3 phases.

The angle controller 130 estimates position and velocity of a rotating magnetic flux. Voltage and current information is used as input of the angle controller 130. Such voltage and current information means voltage and current applied to the PMSM 10, and may be variously determined according sensorless method. Here, the angle controller 130 estimates position and velocity of the rotating magnetic flux using the voltage, current and estimated inductance. As will be described later, the angle controller 130 serves to estimate a current angle to be an actual angle based on a recognized angle error.

The inductance change unit 140 changes inductance, which is one of the parameters of the PMSM 10, used by the d/q-axis current control unit 110 and the angle controller 130. Inductance changed by the inductance converter 140 is supplied to the d/q-axis current control unit 110.

A part of the voltage and current information may not be used as direct input of the angle controller 130 according to the sensorless method. For reference, FIG. 2 illustrates one sensorless method in which only output of the d-axis PI controller 112 is used as input of the angle controller 130.

Feed-forward compensation executed by the d/q-axis current control unit 110 basically includes factors stated in Equation 3 below.

$$\begin{cases} v_{ds\_ff}^r \leftarrow -\hat{\omega}_r \hat{L}_q \hat{i}_{qs}^r \\ v_{qs\_ff}^r \leftarrow \hat{\omega}_r \cdot (\hat{L}_d \hat{i}_{ds}^r + \hat{\lambda}_f) \end{cases}$$ [Equation 3]

Here, $\hat{\omega}_r$ is estimated velocity in sensorless control, ($\hat{L}_d$, $\hat{L}_q$) are estimated d-axis and q-axis synchronous inductance values, and $\hat{\lambda}_f$ is a linked magnetic flux value.

Inductance estimated in accordance with the embodiment of the present disclosure are used in feed-forward compensation of the d/q-axis current control unit 11 and used within the angle controller 130, and is expressed in $L_q$ or $L_s$ in the voltage equation. In accordance with the embodiment of the present disclosure, the inductance used in feed-forward compensation and the inductance used within the angle controller 130 have the same value.

When the d-axis current is set to 0, Equation 2 may be briefly expressed by Equation 4 below.

$$\theta_d \approx \frac{(\hat{L}_q - L_q) \cdot \hat{i}_{qs}^r}{\lambda_f}$$ [Equation 4]

From Equation 4, it is understood that angle error is proportional to inductance error when the d-axis current is set to 0.

Based on the fact that the angle error is directly proportional to the inductance error when the d-axis current is set to 0, the embodiment of the present disclosure proposes a new method of estimating q-axis inductance using signal injection.

For example, when a voltage signal having a frequency differing from the operating frequency of the PMSM 10 during sensorless operation is added to q-axis voltage output, as stated in Equation 5 below, current response at the corresponding frequency, as stated in Equation 6 below, occurs at the d-axis.

$$V_{inj} = V_m \sin \omega_f t$$ [Equation 5]

$$\hat{i}_{dsf}^r = \gamma \cdot \rho \cdot (\hat{L}_q - L_q) \cdot \sin(\omega_f t + \phi)$$ [Equation 6]

Here, $V_{inj}$ is injected voltage, $V_m$ is a magnitude of the injected voltage, $\omega_f$ is $2\pi \cdot f_{inj}$ when $f_{inj}$ is an injected frequency, and $\gamma$, $\rho$, and $\phi$ are constants related to a gain of the current control unit 110, the injected frequency, load, velocity and etc.

Figure 3:
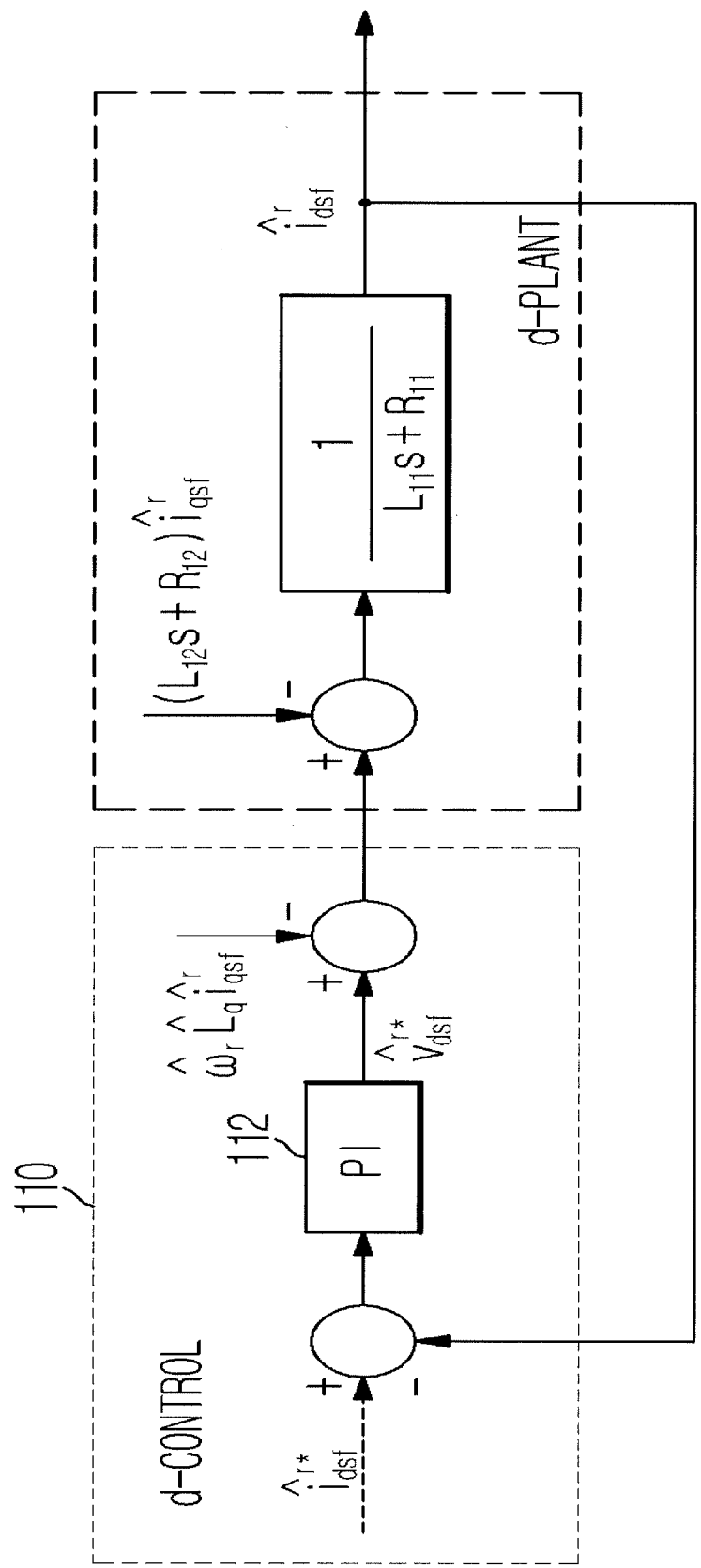
FIG. 3 is a block diagram illustrating d-axis current control of an injected frequency band in the apparatus in accordance with the embodiment of the present disclosure.
Figure 4:
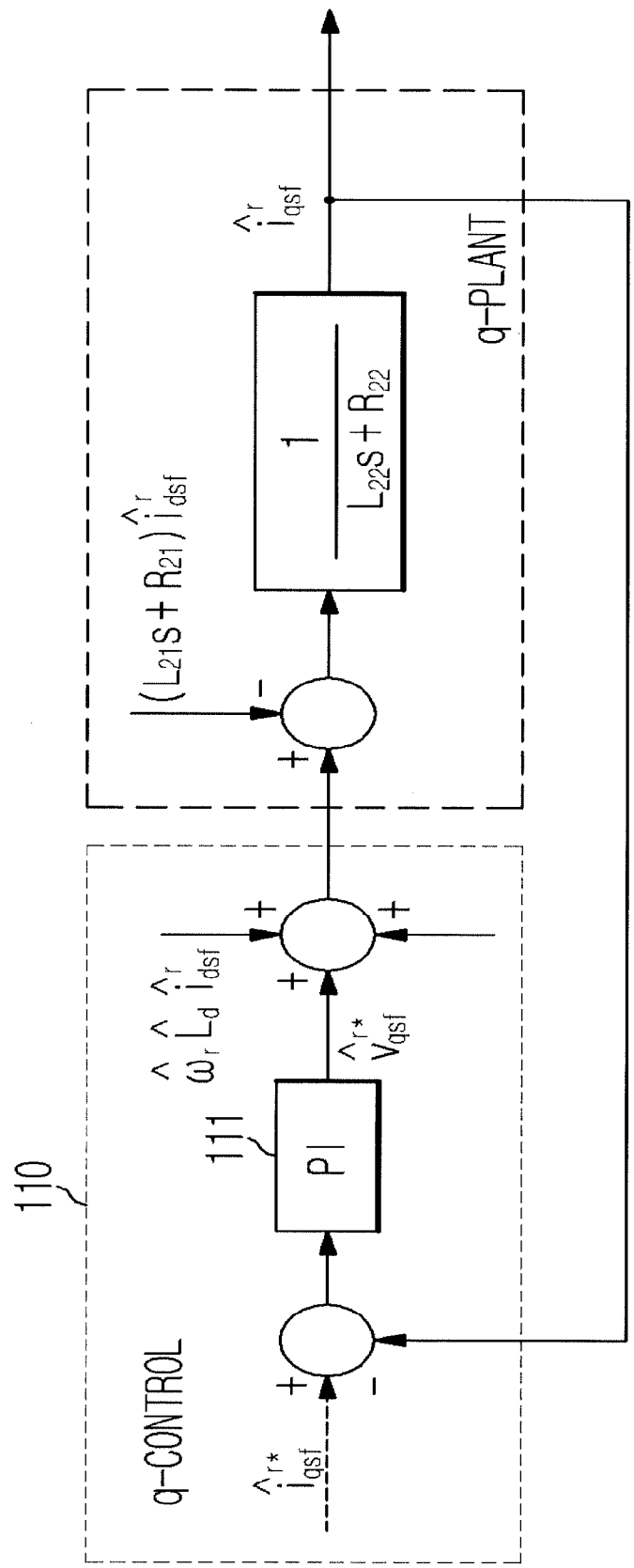
FIG. 4 is a block diagram illustrating q-axis current control of an injected frequency band in the apparatus in accordance with the embodiment of the present disclosure.

FIG. 3 is a block diagram illustrating d-axis current control of an injected frequency band in the apparatus in accordance with the embodiment of the present disclosure. FIG. 4 is a block diagram illustrating q-axis current control of an injected frequency band in the apparatus in accordance with the embodiment of the present disclosure.

FIGS. 3 and 4 illustrate the inside of the d/q-axis current control unit 110, and the d/q-axis current control unit 110 includes the d-axis current controller d-CONTROL and the q-axis current controller q-CONTROL.

As shown in FIG. 3, $\hat{i}_{dsf}^{r*}$ means d-axis reference current in the rotor coordinate system and $\hat{i}_{qsf}^{r*}$ means q-axis reference current in the rotor coordinate system. Reference voltages ($\hat{V}_{dsf}^r$, $\hat{V}_{qsf}^r$) of the d-axis and the q-axis are obtained by causing errors between measured currents $\hat{i}_{dsf}^r$ and $\hat{i}_{qsf}^r$ of the PMSM 10 and the reference currents $\hat{i}_{dsf}^{r*}$ and $\hat{i}_{qsf}^{r*}$ to pass through the q-axis PI controller 111 and the d-axis PI controller 112. In order to minimize coupling between the d-axis and the q-axis, d-axis and q-axis voltage values applied to the PMSM 10 are calculated by adding the feed-forward compensation components of Equation 3 to the reference voltages.

The injected signal may be added through the method in which the signal of the injected voltage $V_{inj}$ of Equation 5 is added to the voltage output of the q-axis PI controller 111, as shown in FIG. 4. Here, d-axis current response $\hat{i}_{dsf}^r$ obtained through a motor plant p-PLANT may be obtained by Equation 6.

In more detail, in Equation 6, when the signal having a frequency differing from the operating frequency of the PMSM 10 during sensorless operation is injected to the q-axis, an injected frequency component having amplitude proportional to the inductance error is generated in the d-axis current response. Thereby, it is judged that the inductance error is smallest when the amplitude of the d-axis current response is the narrowest.

In the case of the SMPMSM not having saliency, since d-axis inductance and q-axis inductance are the same (Ld=Lq), Lq may be substituted with Ls and thus d-axis current response may be expressed by Equation 7 below in which Lq may be substituted with Ls.

$$\hat{i}_{dsf}^r = \gamma \cdot \sigma \cdot \omega_r \cdot (\hat{L}_s - L_s) \cdot \sin(\omega_i t - \psi) \qquad [\text{Equation 7}]$$

In Equation 7, $\gamma$ is the same as in Equation 6, $\sigma$ and $\psi$ are constants related to a gain of the d/q-axis current control unit 110 and the injected frequency, and $\omega_r$ is electrical angular velocity of the motor. Of course, in this case, it is understood that, when the signal having a frequency differing from the operating frequency is injected to the q-axis, d-axis current response proportional to a difference $(\hat{L}_s - L_s)$ between estimated inductance and actual inductance is generated.

In accordance with the embodiment of the present disclosure, inductance of the motor is estimated based on the d-axis current response to signal injection into the q-axis. However, on the contrary, estimation of inductance may be executed by injecting a signal into the d-axis and detecting q-axis current response to the injected signal.

Figure 5:
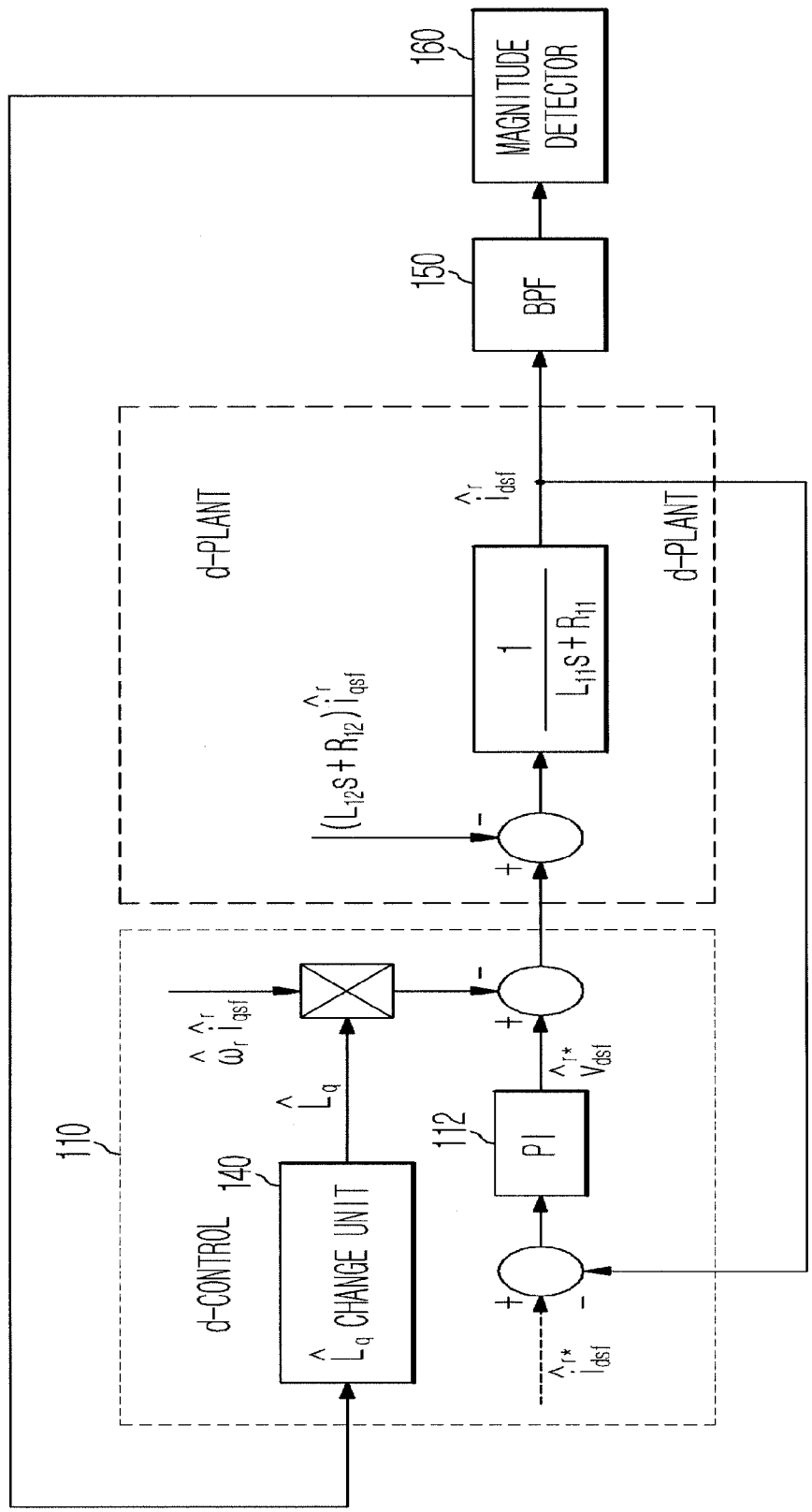
FIG. 5 is a block diagram illustrating estimation of inductance in the apparatus in accordance with the embodiment of the present disclosure.

FIG. 5 is a block diagram illustrating estimation of inductance in the apparatus in accordance with the embodiment of the present disclosure;

As shown in FIG. 5, the inductance estimation unit 100 of the apparatus in accordance with the embodiment of the present disclosure includes a band pass filter (BPF) 150 to extract only the signal of the injected frequency band from the d-axis current response together with the inductance change unit 140 to change the estimated inductance Lq value provided by the d-axis current controller 12 shown in FIG. 3 for inductance estimation, and a magnitude detector 160 to detect a magnitude of the injected frequency signal for the d-axis current response.

From Equations 6 and 7 above, it is understood that, if inductance used in d-axis feed-forward compensation and inductance used in sensorless control are identical, current response to the injected voltage signal is minimal when the inductance is identical with an actual value of the inductance.

Since d-axis current response to the voltage injected into the q-axis is varied according to error of inductance used in feed-forward compensation through Equation 6, the proposed method allows the d-axis current response to be observed while varying the value of inductance used in d-axis feed-forward compensation during injection of the voltage signal into the q-axis.

In order to observe current corresponding to the injected frequency, one BPF 150 is used. Observation of amplitude of a specific frequency signal is unrelated to phase delay, thus raising an attenuation rate of a cutoff frequency of the BPF 150 and thus reducing error due to noise. The inductance change unit 140 checks the measured current response and then changes the inductance value to find accurate inductance.

Hereinafter, the relation between angle error and inductance and effect of the inductance on the angle error in an SMPMSM will be exemplarily described in more detail.

As shown in FIG. 2, in the SMPMSM which is operated at a maximum torque per ampere (TPA), a current command $\hat{i}_{ds}^{r*}$ is 0 and the d/q-axis current control unit 110 acts such that $\hat{i}_{ds}^r$ follows 0.

$\hat{i}_{ds}^r$ satisfies Equation 8 below.

$$\hat{i}_{ds}^r = \frac{1}{L_s s + R_s} \hat{v}_{dso}^r \qquad [\text{Equation 8}]$$

In order to set to $\hat{i}_{ds}^r$ to 0, $\hat{v}_{dso}^r$ in Equation 8 needs to be 0. $\hat{v}_{dso}^r$ satisfies Equation 9 below and $\hat{i}_{ds}^r$ is set to 0, thereby yielding Equation 10 below.

$$\hat{v}_{dso}^r = \hat{v}_{ds}^{r*} + \hat{\omega}_r \cdot (L_s - \hat{L}_s) \cdot \hat{i}_{qs}^r + \omega_r \lambda_f \sin \theta_d \qquad [\text{Equation 9}]$$

$$\hat{v}_{ds}^{r*} \approx \hat{\omega}_r \cdot (\hat{L}_s - L_s) \cdot \hat{i}_{qs}^r - \omega_r \lambda_f \sin \theta_d \qquad [\text{Equation 10}]$$

In the sensorless method using output of the d-axis PI controller 112, the left part of Equation 11 below indicates each error and is used as input of the angle controller 130.

$$-\frac{\hat{v}_{ds}^{r*}}{\hat{\omega}_r \lambda_f} = \frac{(L_s - \hat{L}_s)}{\hat{\lambda}_f} \cdot \hat{i}_{qs}^r + \frac{\omega_r \lambda_f}{\hat{\omega}_r \lambda_f} \sin \theta_d \qquad [\text{Equation 11}]$$

Since the angle controller 130 controls the estimated angle so that the input of the angle controller 130 becomes 0, deviation of the estimated angle is determined at a point where the left part of Equation 11 becomes 0, Since an estimated value of a sufficiently high velocity is comparatively accurate in sensorless operation using the voltage equation, it may be assumed that actual velocity $\omega_r$ and estimated velocity $\hat{\omega}_r$ are approximately identical, and Equation 12 below is obtained when the left part of Equation 11 is set to 0.

$$\sin \theta_d = \frac{(\hat{L}_s - L_s)}{\hat{\lambda}_f} \cdot \hat{i}_{qs}^r \qquad [\text{Equation 12}]$$

Further, if the angle deviation is small and thus it is assumed that $\sin \theta_d \approx \theta_d$, Equation 13 below is obtained based on definition of the angle error $\theta_d$ as $\theta - \hat{\theta}$.

$$\hat{\theta} = \theta_d + \frac{(L_s - \hat{L}_s)}{\lambda_f} \cdot \hat{i}_{qs}^r \qquad [\text{Equation 13}]$$

From Equation 13, it is understood that error of inductance used in feed-forward compensation of the d/q-axis current control unit 110 is proportional to the angle deviation when the d-axis current is set to 0. This may be confirmed by observing the angle deviation while varying inductance used in d-axis feed-forward compensation by a predetermined value.

As described above, it is understood that the error of inductance used in feedforward compensation during sensorless operation is proportional to the angle deviation when the d-axis current is set to 0. If the angle error proportional to the inductance error may be detected, inductance may be estimated using the angle error.

Since, in each error detection using the voltage equation, each error is observed on the assumption that used parameters are accurate, the parameters may not estimated by recognizing each error using a voltage equation, parameters of which are not accurate. That is, only if each error may be detected independently from the voltage equation, inductance may be more accurately estimated.

In addition to the sensorless operation method using the voltage equation, there is a sensorless operation method using reaction occurring after injection of a specific signal. If each error may be detected through signal injection, parameters constituting the voltage equation may be estimated through detection of each error without use of the voltage equation.

The embodiment of the present disclosure proposes a new method of estimating inductance by checking reaction through signal injection in order to detect inductance error.

In the proposed method in accordance with the embodiment of the present disclosure, a position at which a signal is injected and an injected frequency of the signal are first determined.

In order to control d-axis current $\hat{i}_{ds}^r$ pulsating when square wave voltage is injected into the d-axis, output $\hat{v}_{ds}^{r*}$ of the d-axis PI controller pulsates in opposite to a phase of current. Since the output $\hat{v}_{ds}^{r*}$ is used as input of the angle controller during sensorless control, estimated velocity $\omega_{rm}$ pulsates due to proportional and integral gains of the angle controller. Consequently, a velocity controller reacts to error between the estimated velocity and a velocity command, and thereby q-axis current pulsates due to change of a q-axis current command. That is, if the signal is injected into the d-axis, not only a component generated by intersection between the injected voltage and the q-axis but also interference of the injected frequency by the velocity controller may be mixed with q-axis current.

Further, if the signal is injected into the q-axis, a component generated by intersection between the injected voltage and the d-axis is small, a pulsating degree of $\hat{v}_{ds}^{r*}$ is very small, and thus error between estimated velocity and actual velocity is small. A pulsating degree of q-axis current in this case is larger than in the case of injection of the square wave voltage into the d-axis, but a q-axis command is scarcely changed and thus reaction only to the injected voltage without effect of the velocity controller occurs. Therefore, in accordance with the embodiment of the present disclosure, a voltage signal is injected into the q-axis of the rotor coordinate system.

As a frequency of the injected voltage signal, any frequency differing from the operating frequency of the PMSM 10 during sensorless operation may be employed.

Hereinafter, current response to injected voltage will be described.

A voltage equation of an estimated rotor coordinate system of a PMSM on the assumption that $\omega_r \approx \hat{\omega}_r$ is expressed by Equation 14 below.

$$\begin{bmatrix} \hat{v}_{ds}^r \\ \hat{v}_{qs}^r \end{bmatrix} = \begin{bmatrix} R_s - \omega_r \Delta L \sin\theta_d \cos\theta_d & -\omega_r(L_q + \Delta L \sin^2\theta_d) \\ \omega_r(L_q + \Delta L \cos^2\theta_d) & R_s + \omega_r \Delta L \sin\theta_d \cos\theta_d \end{bmatrix} \quad \text{[Equation 14]}$$

$$\begin{bmatrix} \hat{i}_{ds}^r \\ \hat{i}_{qs}^r \end{bmatrix} + \begin{bmatrix} L_q + \Delta L \cos^2\theta_d & \Delta L \sin\theta_d \cos\theta_d \\ \Delta L \sin\theta_d \cos\theta_d & L_q + \Delta L \sin^2\theta_d \end{bmatrix} \begin{bmatrix} p\hat{i}_{ds}^r \\ p\hat{i}_{qs}^r \end{bmatrix} +$$

$$\omega_r \lambda_f \begin{bmatrix} -\sin\theta_d \\ \cos\theta_d \end{bmatrix}$$

In Equation 14, actual velocity $\omega_r$ pulsates with the injected frequency due to torque contribution of the q-axis current reacting to the voltage injected into the q-axis. However, since torque pulsation of a high frequency may be neglected to some degree by a time constant of a mechanical system, a frequency differing from the operating frequency is used as the injected frequency.

Using the proper frequency, the member of $\omega_r \lambda_f \sin\theta_d$ and the member of $\omega_r \lambda_f \cos\theta_d$ may be neglected in analysis of the injected frequency band. The injected frequency band satisfies a voltage equation expressed by Equation 15 below.

$$\begin{bmatrix} \hat{v}_{dsf}^r \\ \hat{v}_{qsf}^r \end{bmatrix} = \begin{bmatrix} R_s - \omega_r \Delta L \sin\theta_d \cos\theta_d & -\omega_r(L_q + \Delta L \sin^2\theta_d) \\ \omega_r(L_q + \Delta L \cos^2\theta_d) & R_s + \omega_r \Delta L \sin\theta_d \cos\theta_d \end{bmatrix} \quad \text{[Equation 15]}$$

$$\begin{bmatrix} \hat{i}_{dsf}^r \\ \hat{i}_{qsf}^r \end{bmatrix} + \begin{bmatrix} L_q + \Delta L \cos^2\theta_d & \Delta L \sin\theta_d \cos\theta_d \\ \Delta L \sin\theta_d \cos\theta_d & L_q + \Delta L \sin^2\theta_d \end{bmatrix} \begin{bmatrix} p\hat{i}_{dsf}^r \\ p\hat{i}_{qsf}^r \end{bmatrix}$$

In order to execute simple development, Equation 15 may be briefly expressed by Equation 16 below.

$$\begin{bmatrix} \hat{v}_{dsf}^r \\ \hat{v}_{qsf}^r \end{bmatrix} = \begin{bmatrix} R_{11} & R_{12} \\ R_{21} & R_{22} \end{bmatrix} \begin{bmatrix} \hat{i}_{dsf}^r \\ \hat{i}_{qsf}^r \end{bmatrix} + \begin{bmatrix} L_{11} & L_{12} \\ L_{21} & L_{22} \end{bmatrix} \begin{bmatrix} p\hat{i}_{dsf}^r \\ p\hat{i}_{qsf}^r \end{bmatrix} \quad \text{[Equation 16]}$$

FIGS. 3 and 4 illustrate block diagrams illustrating d-axis current control and q-axis current control based on Equation 16. Since the d-axis current is set to 0, d-axis feed-forward compensation does not include a component due to resistance.

Under the condition that a load variation is small and thus a step variation of a current command is small, the current command corresponding to the injected frequency may be regarded as almost 0. If proportional and integral gains of the d-axis are referred to $k_{pd}$ and $k_{id}$ and proportional and integral gains of the q-axis are referred to $k_{pq}$ and $k_{iq}$, Equation 17 below is satisfied.

$$\begin{cases} \hat{v}_{dsf}^{r*} \approx -\dfrac{k_{pd}s + k_{id}}{s} \cdot \hat{i}_{dsf}^r \\ \hat{v}_{qsf}^{r*} \approx -\dfrac{k_{pq}s + k_{iq}}{s} \cdot \hat{i}_{qsf}^r \end{cases} \quad \text{[Equation 17]}$$

Equation 17 indicates voltages generated by currents fed back to the d/q-axis current control unit 110, and mutually intersecting components of the d-axis and q-axis are not described only using Equation 17. The d/q-axis current control unit 110 controls a current component of the injected frequency band to follow the current command. In order to cause $\hat{i}_{dsf}^r$ and $\hat{i}_{qsf}^r$ to follow a command of 0, Equation 18 below is obtained.

$$\begin{cases} \hat{v}_{dsf}^{r*} - \omega_r \hat{L}_q \hat{i}_{qsf}^r - (L_{12}s + R_{12})\hat{i}_{qsf}^r \approx 0 \\ \hat{v}_{qsf}^{r*} + V_{inj} + \omega_r \hat{L}_d \hat{i}_{dsf}^r - (L_{21}s + R_{21})\hat{i}_{dsf}^r \approx 0 \end{cases} \quad \text{[Equation 18]}$$

When Equation 17 is applied to Equation 18 and the differential member is substituted with $j\omega_f$, Equation 19 below is obtained.

$$\begin{bmatrix} k_{pd} + \dfrac{k_{id}}{j\omega_f} & \omega_r \hat{L}_q + R_{12} + j\omega_f L_{12} \\ -\omega_r \hat{L}_d + R_{21} + j\omega_f L_{21} & k_{pq} + \dfrac{k_{iq}}{j\omega_f} \end{bmatrix} \begin{bmatrix} \tilde{i}_{dsf}^r \\ \tilde{i}_{qsf}^r \end{bmatrix} = \begin{bmatrix} 0 \\ V_{inj} \end{bmatrix}$$ [Equation 19]

Reaction of current to the injected voltage satisfies Equation 21 below through definition of Equation 20 below based on Equation 19 above.

$$\begin{cases} k_{pd} = L_{kd}\omega_c \\ k_{pq} = L_{kq}\omega_c \\ k_{id} = k_{iq} = R_k \omega_c \\ \Delta L_q = \hat{L}_q - L_q \\ \Delta L_d = \hat{L}_d - L_d \end{cases}$$ [Equation 20]

$$\begin{bmatrix} \tilde{i}_{dsf}^r \\ \tilde{i}_{qsf}^r \end{bmatrix} =$$ [Equation 21]

$$\dfrac{1}{\det} \begin{bmatrix} k_{pq} + \dfrac{k_{iq}}{j\omega_f} & -\omega_r \hat{L}_q - R_{12} - j\omega_f L_{12} \\ \omega_r \hat{L}_d - R_{21} - j\omega_f L_{21} & k_{pd} + \dfrac{k_{id}}{j\omega_f} \end{bmatrix} \begin{bmatrix} 0 \\ V_{inj} \end{bmatrix}$$

On the assumption that each variation of det of Equation 21 is sufficiently small and thus $\sin\theta_d \approx \theta_d$ and $\cos\theta_d \approx 1$ are satisfied, Equation 22 below is obtained, and then when $\tilde{i}_{dsf}^r$ is calculated from Equation 21, Equation 23 below is obtained.

$\det =$ [Equation 22]

$$\omega_c^2 \left\{ L_{kd} L_{kq} - \dfrac{R_k^2}{\omega_f^2} \right\} + \omega_r^2 (\Delta L_q - \Delta L \theta_s^2) \Delta L_d + \omega_f^2 \Delta L^2 \theta_d^2 -$$

$$j\omega_f \left[ R_k (L_{kd} + L_{kq}) \dfrac{\omega_c^2}{\omega_f^2} + \omega_r \Delta L \theta_d \{-\Delta L_d + \Delta L_q - \Delta L \theta_d^2\} \right]$$

$$\tilde{i}_{dsf}^r \approx \dfrac{\omega_r (\Delta L_q + \Delta L \theta_d^2) - j\omega_f \cdot \Delta L \theta_d}{\det} V_{inj}$$ [Equation 23]

Since the proportional relation between $\theta_d$ and $\Delta L_q$ is satisfied during sensorless operation of the PMSM in which d-axis current is set to 0, $\theta_d$ in Equation 22 and Equation 23 may be substituted with a member proportional to $\Delta L_q$, such as $\alpha \Delta L_q$. When it is assumed that a current control bandwidth is sufficiently larger than the electrical operating frequency and first order linear approximation of $\alpha \Delta L_q$ of Equation 23 is executed, Equation 24 below is obtained.

$$\tilde{i}_{dsf}^r \approx \dfrac{\Delta L_q V_{inj}}{\omega_c^4 \left\{ L_{kd} L_{kq} - \dfrac{R_k^2}{\omega_f^2} \right\}^2 + R_k^2 (L_{kd} + L_{kq})^2 \dfrac{\omega_c^4}{\omega_f^2}}$$ [Equation 24]

$$\left[ \omega_r \omega_c^2 \left\{ L_{kd} L_{kq} - \dfrac{R_k^2}{\omega_f^2} \right\} + \alpha R_k \Delta L (L_{kd} + L_{kq}) \omega_c^2 + j\omega_f \cdot \right.$$

$$\left. \left\{ \omega_r R_k (L_{kd} + L_{kq}) \dfrac{\omega_c^2}{\omega_f^2} - \alpha \Delta L \omega_c^2 \left( L_{kd} L_{kq} - \dfrac{R_k^2}{\omega_f^2} \right) \right\} \right]$$

When Equation 24 is expressed by a function of time by defining a signal injected into the q-axis as $V_{inj} = V_m \sin \omega_f t$ and substituting $j\omega_f$ with a differential member of time, Equation 25 is obtained.

Here, $\gamma$, $\rho$, and $\phi$ are respectively expressed by Equations 26, 27 and 28 below.

$$\tilde{i}_{dsf}^r = \gamma \cdot \rho \cdot \Delta L_q \cdot \sin(\omega_f t + \phi)$$ [Equation 25]

$$\gamma = \dfrac{V_m}{\omega_c^2 \left\{ L_{kd} L_{kq} - \dfrac{R_k^2}{\omega_f^2} \right\}^2 + R_k^2 (L_{kd} + L_{kq})^2 \dfrac{\omega_c^2}{\omega_f^2}}$$ [Equation 26]

$$\rho = \sqrt{\dfrac{\left\{ \omega_r \left( L_{kd} L_{kq} - \dfrac{R_k^2}{\omega_f^2} \right) + \alpha R_k \Delta L (L_{kd} + L_{kq}) \right\}^2 +}{\omega_f^2 \left\{ \omega_r R_k (L_{kd} + L_{kq}) \dfrac{1}{\omega_f^2} - \alpha \Delta L \left( L_{kd} L_{kq} - \dfrac{R_k^2}{\omega_f^2} \right) \right\}^2}}$$ [Equation 27]

$$\phi = \dfrac{\omega_f \left\{ \omega_r R_k (L_{kd} + L_{kq}) \dfrac{\omega_c^2}{\omega_f^2} - \alpha \Delta L \omega_c^2 \left( L_{kd} L_{kq} - \dfrac{R_k^2}{\omega_f^2} \right) \right\}}{\omega_r \omega_c^2 \left\{ L_{kd} L_{kq} - \dfrac{R_k^2}{\omega_f^2} \right\} + \alpha R_k \Delta L (L_{kd} + L_{kq}) \omega_c^2}$$ [Equation 28]

If reaction of the d-axis current to the voltage signal injected to the q-axis, i.e., $\Delta L_q$ is 0 in Equation 25 and thus estimated inductance coincides with actual inductance, the current amplitude of the injected frequency becomes 0. However, if $\rho = 0$, Equation 25 may become 0 although $\Delta L_q$ is not 0.

In order to allow $\rho$ to be 0 in Equation 27, salient $\Delta L$ needs to satisfy simultaneous equations in Equation 29. If the simultaneous equations in Equation 29 are solved using definition of Equation 30 below, Equation 31 needs to be obtained. However, since $\xi$ and $\omega_f$ are actual numbers, Equation 31 is not obtained, and the amplitude of d-axis reaction current is proportional to $\Delta L_q$ at all times regardless of salient $\Delta L$.

$$\begin{cases} \Delta L = \dfrac{-\omega_r \left( L_{kd} L_{kq} - \dfrac{R_k^2}{\omega_f^2} \right)}{\alpha R_k (L_{kd} + L_{kq})} \\ \Delta L = \dfrac{\omega_r R_k (L_{kd} + L_{kq}) \dfrac{1}{\omega_f^2}}{\alpha \left( L_{kd} L_{kq} - \dfrac{R_k^2}{\omega_f^2} \right)} \end{cases}$$ [Equation 29]

$$\xi = \dfrac{\omega_r \left( L_{kd} L_{kq} - \dfrac{R_k^2}{\omega_f^2} \right)}{R_k (L_{kd} + L_{kq})}$$ [Equation 30]

$$\xi^2 = -\frac{1}{\omega_f^2} \quad \text{[Equation 31]}$$

Since a member related to the angle error $\theta_d$ is multiplied by salient $\Delta L$ at all times, the general SMPMSM is not a target to which angle error detection through signal injection is applied. However, even if $\Delta L=0$ which is a characteristic of the SMPMSM is applied by Equation 25, it is expected that current response to the injected voltage signal is generated. A voltage equation of the SMPMSM in an injected frequency region is expressed by Equation 32 below.

$$\begin{bmatrix} \hat{v}_{dsf}^r \\ \hat{v}_{qsf}^r \end{bmatrix} = \begin{bmatrix} R_s & -\omega_r L_s \\ \omega_r L_s & R_s \end{bmatrix} \begin{bmatrix} \hat{i}_{dsf}^r \\ \hat{i}_{qsf}^r \end{bmatrix} \quad \text{[Equation 32]}$$

In the same manner as Equation 19, a voltage signal and current having a frequency differing from the operating frequency of the SMPMSM satisfy Equation 33 below.

$$\begin{bmatrix} k_{pd} + \frac{k_{id}}{j\omega_f} & \omega_r \hat{L}_s - \omega_r L_s \\ -\omega_r \hat{L}_s + \omega_r L_s & k_{pq} + \frac{k_{iq}}{j\omega_f} \end{bmatrix} \begin{bmatrix} \hat{i}_{dsf}^r \\ \hat{i}_{qsf}^r \end{bmatrix} = \begin{bmatrix} 0 \\ V_{inj} \end{bmatrix} \quad \text{[Equation 33]}$$

If Equation 33 is solved using definition of Equation 34, Equation 35 below is obtained, and if the proportional and integral gains of Equation 20 are applied to the d-axis current, Equation 36 below is obtained.

$$\Delta L_s = \hat{L}_s - L_s \quad \text{[Equation 34]}$$

$$\begin{bmatrix} \hat{i}_{dsf}^r \\ \hat{i}_{qsf}^r \end{bmatrix} = \frac{1}{\left(k_{pd} + \frac{k_{id}}{j\omega_f}\right)\left(k_{pq} + \frac{k_{iq}}{j\omega_f}\right) + \omega_r^2 \Delta L_s^2} \begin{bmatrix} k_{pq} + \frac{k_{iq}}{j\omega_f} & -\omega_r \Delta L_s \\ \omega_r \Delta L_s & k_{pd} + \frac{k_{id}}{j\omega_f} \end{bmatrix} \begin{bmatrix} 0 \\ V_{inj} \end{bmatrix} \quad \text{[Equation 35]}$$

$$\hat{i}_{dsf}^r = \frac{-\omega_r \Delta L_s}{\omega_c^2 \left\{ L_{kd} L_{kq} - \frac{R_k^2}{\omega_f^2} - j\frac{R_k}{\omega_f}(L_{kd} + L_{kq}) \right\} + \omega_r^2 \Delta L_s^2} V_{inj} \quad \text{[Equation 36]}$$

If it is assumed that $\Delta L_s^2 \approx 0$, the signal injected into the q-axis is defined as $V_m \sin \omega_f t$, and $j\omega_f$ is substituted with a differential member of time in Equation 36, Equation 37 is obtained. Here, $\sigma$ and $\psi$ are respectively expressed by Equations 38 and 39 below.

$$\hat{i}_{dsf}^r = \gamma \cdot \sigma \cdot \omega_r \cdot \Delta L_s \cdot \sin(\omega_f t - \psi) \quad \text{[Equation 37]}$$

$$\sigma = \sqrt{\left(L_{kd} L_{kq} - \frac{R_k^2}{\omega_f^2}\right)^2 + R_k^2(L_{kd} + L_{kq})\frac{1}{\omega_f^2}} \quad \text{[Equation 38]}$$

$$\psi = \frac{R_k(L_{kd} + L_{kq})\frac{1}{\omega_f}}{\left(L_{kd} L_{kq} - \frac{R_k^2}{\omega_f^2}\right)} \quad \text{[Equation 39]}$$

Here, $\gamma$ is defined in advance in Equation 26 above. A result of Equation 37 regarding the d-axis current response of the SMPMSM is the same as a result obtained by applying the relation of $\Delta L=0$ to Equation 25. Consequently, through Equation 25 and Equation 37, a point where the amplitude of d-axis current response to the q-axis injected voltage signal of the PMSM is minimal is a point where estimated inductance coincides with actual inductance.

As described above, tendency to minimize the magnitude of d-axis current response to the q-axis injected voltage when feed-forward compensation inductance of the PMSM is accurate, using the proportional relation between inductance error and each error is deduced through equations.

Since inductance influencing sign factors of each error information is inductance used in d-axis feed-forward compensation, an algorithm of estimating inductance in real time proposed by the embodiment of the present disclosure is executed based on d-axis current control.

Since response of the d-axis current to the q-axis injected voltage is varied according to error of the inductance used in the d-axis feed-forward compensation through Equation 25, the proposed method includes observing the d-axis current response while varying the value of the inductance used in the d-axis feed-forward compensation during injection of a voltage signal into the q-axis.

Figure 6:
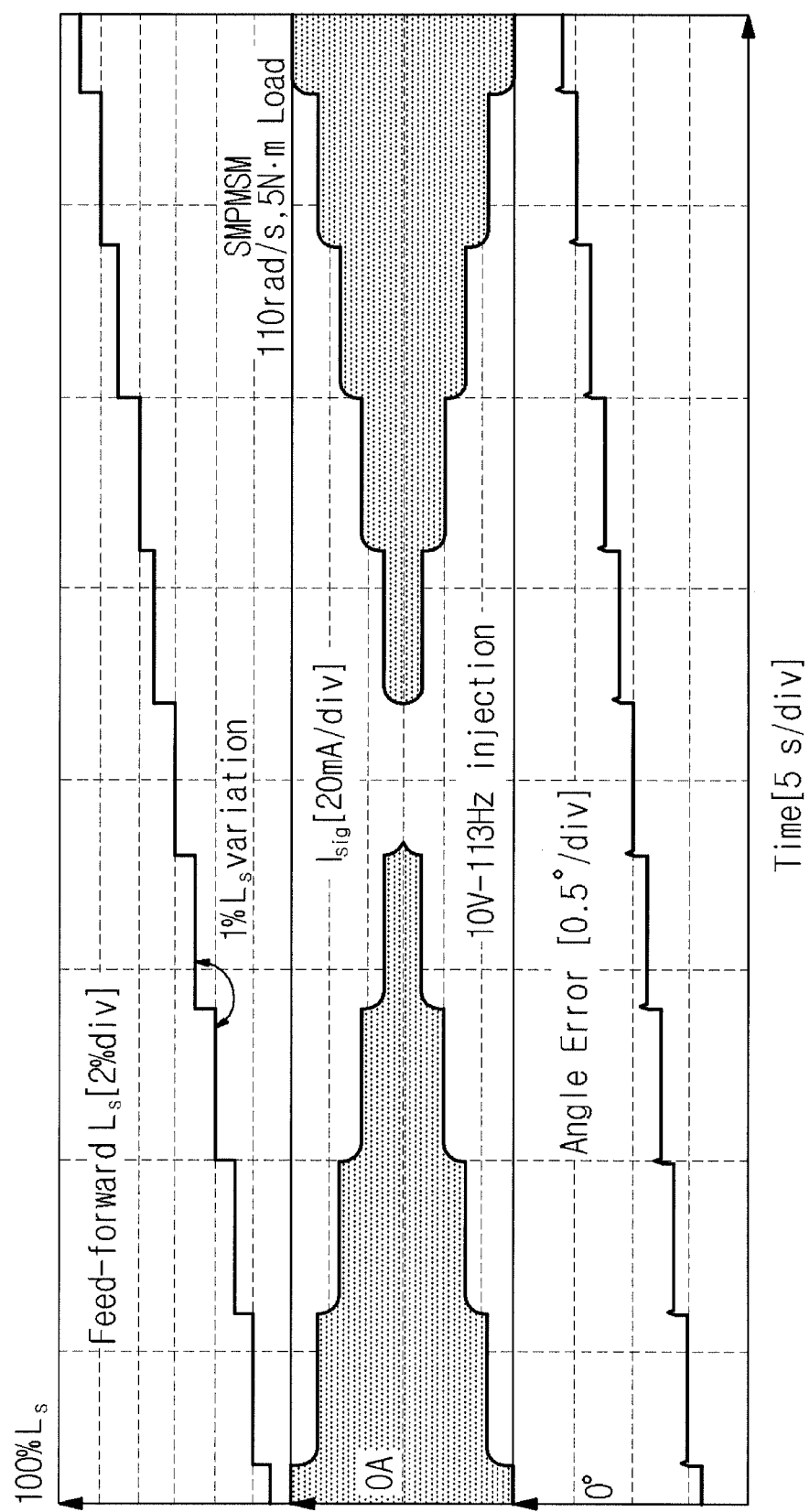
FIG. 6 is a graph illustrating current response according to inductance variation of a surface-mounted permanent magnet synchronous motor (SMPMSM) in the apparatus in accordance with the embodiment of the present disclosure.

FIG. 6 is a graph illustrating current response according to inductance variation of a surface-mounted permanent magnet synchronous motor (SMPMSM) in the apparatus in accordance with the embodiment of the present disclosure. The graph of FIG. 6 illustrates a result of a simulation in which d-axis response current is observed while varying inductance used in feed-forward compensation by 1% of actual inductance. Here, a signal injected into the q-axis is 10V-113 Hz.

As shown in FIG. 6, the horizontal axis represents inductance values and the vertical axis represents magnitudes of current response. $I_{sig}$ is a signal obtained by processing d-axis current using a band pass filter.

As understood from FIG. 6, since it is confirmed that an inductance value causing minimal current response is present, it is confirmed that inductance may be estimated based on response of d-axis current to the injected voltage signal, when operating velocity and load of the PMSM relative to operation conditions are regular. That is, since the amplitude of the d-axis current response is minimal when inductance used in feed-forward compensation coincides with actual inductance, it is understood that inductance may be estimated based on the magnitude of the d-axis current response.

Figure 7:
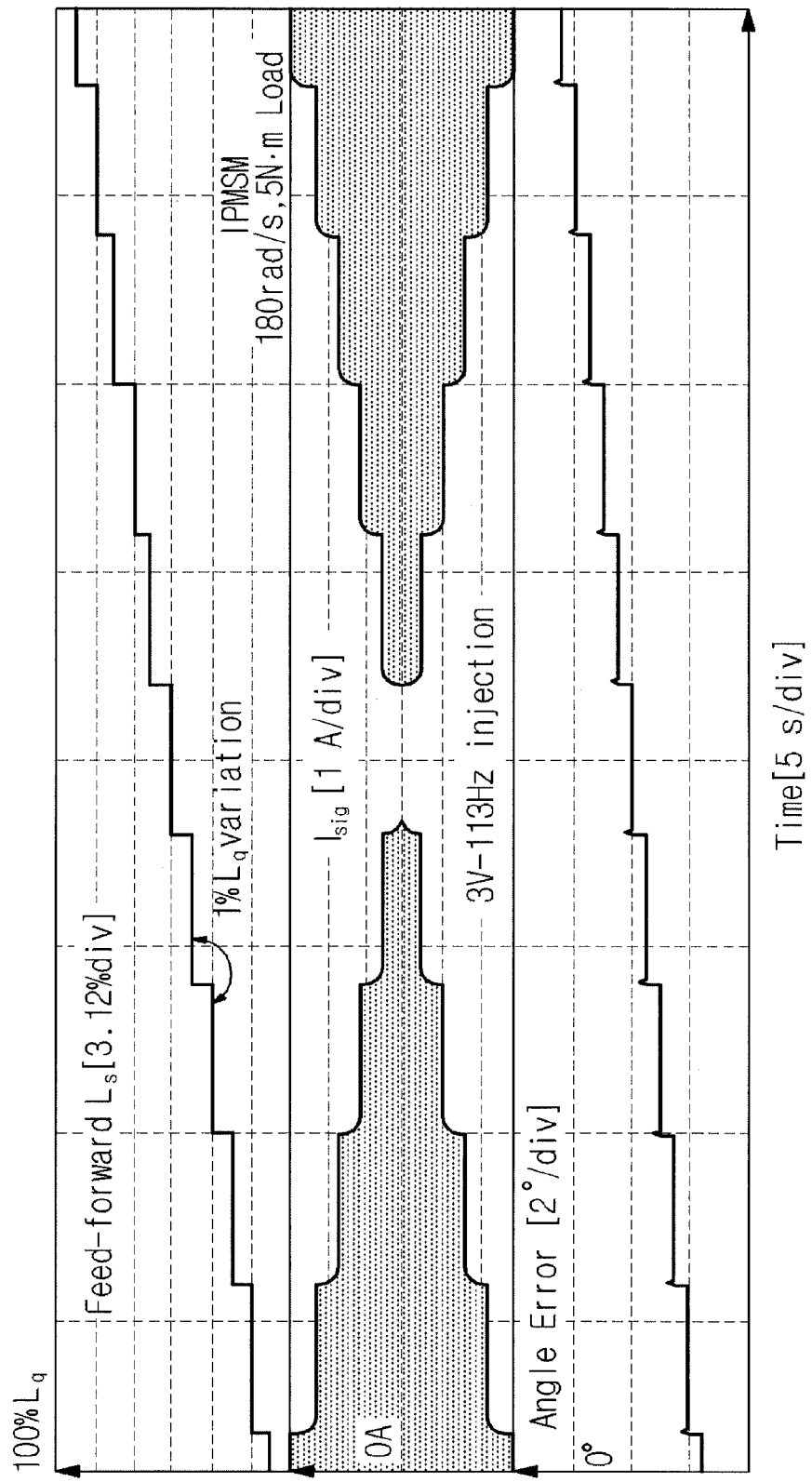
FIG. 7 is a graph illustrating current response according to inductance variation of an interior permanent magnet synchronous motor (IPMSM) in the apparatus in accordance with the embodiment of the present disclosure.

FIG. 7 is a graph illustrating current response according to inductance variation of an interior permanent magnet synchronous motor (IPMSM) in the apparatus in accordance with the embodiment of the present disclosure. The graph of FIG. 7 illustrates a result of a simulation in which d-axis response current is observed while varying inductance used in feed-forward compensation by 1% of actual inductance.

As understood from FIG. 7, it is confirmed that inductance may be estimated based on magnitudes of d-axis current response.

As described above, it is confirmed that, if inductance used in d-axis feed-forward compensation and inductance used in sensorless control are identical, current response to the injected voltage signal is minimal when the inductance is identical with actual inductance.

In accordance with the embodiment of the present disclosure, whether or not inductance, estimated at a point where current response to the injected voltage signal is minimal, coincides with actual inductance is judged based on the above analysis.

FIG. 8 is a flowchart illustrating a method of estimating inductance in the apparatus in accordance with the embodiment of the present disclosure.

That is, FIG. 8 is a flowchart illustrating an algorithm of estimating inductance in accordance with the embodiment of the present disclosure. The flowchart of FIG. 8 illustrates estimation of inductance, used in control of the PMSM 10 during sensorless operation, by the inductance estimation unit 100.

First, the inductance estimation unit 100 injects a signal having a frequency differing from the operating frequency into a drive signal of the PMSM 10 during sensorless operation (Operation 1000). For example, the inductance estimation unit injects the signal having the frequency differing from the operating frequency into the q-axis of a rotor coordinate system of the PMSM 10. Here, in order to start control of the PMSM 10, an inductance value which is proximate to some degree needs to be provided at an initial stage, and thus an inductance value Lq at the initial stage is selected and the algorithm is started using the inductance value Lq.

After injection of the signal (Operation 1000), the inductance estimation unit 100 changes an inductance value used in feed-forward compensation of the d/q-axis current control unit 110, i.e., an inductance value used in control of the PMSM 10 (Operation 1001).

After change of the inductance value used in control of the PMSM 10 (Operation 1001), the inductance estimation unit 100 senses current response at this moment (Operation 1002). For example, the inductance estimation unit 100 reads a magnitude of d-axis current. Here, the magnitude of the d-axis current is obtained through the magnitude detector 160 to calculate the magnitude of the current response having passed through the BPF 150.

After sensing of the current response (Operation 1002), the inductance estimation unit 100 stores and judges the magnitude of the sensed current response (Operation 1003).

After storage and judgment of the magnitude of the current response (Operation 1003), the inductance estimation unit 100 judges whether or not the number of sensed current responses is plural (Operation 1004).

Upon judging that the number of the sensed current responses is not plural as a result of the judgment of Operation 1004, the inductance estimation unit 100 return to Operation 1001 and executes the subsequent Operations.

On the other hand, upon judging that the number of the sensed current responses is plural as the result of the judgment of Operation 1004, the inductance estimation unit 100 compares magnitudes of the plural current responses to each other (Operation 1005).

After comparison between the magnitudes of the plural current responses (Operation 1005), the inductance estimation unit detects an inductance value used in control of the PMSM 10 (Operation 1006).

After detection of the inductance value in the operation mode (Operation 1006), the inductance estimation unit 100 judges that the detected inductance value is an actual inductance value of the PMSM 10 (Operation 1007).

In summary, the inductance estimation unit 100 judges whether or not the magnitude of current response is minimal after signal injection, repeats a sequence of confirming current response while varying an inductance value, upon judging that the magnitude of current response is not minimal, and judges the inductance value to be an accurately estimated inductance value and uses such an inductance value in real time as an inductance value used by the angle controller 130 as well as used in feed-forward compensation of the d/q-axis current control unit 110, upon judging that the magnitude of current response is minimal.

Therefore, inductance estimation is completed when an inductance value causing the magnitude of d-axis current response to the injected frequency to be minimal is detected.

The inductance value estimated through the above method is reflected in parameters of the PMSM 10 to execute feed-forward compensation of the d/q-axis current control unit 110 and to operate the angle controller 130, thus being used in position and velocity control of the PMSM 10.

As is apparent from the above description, in accordance with one embodiment of the present disclosure, inductance used in control of a PMSM during sensorless operation may be estimated in real time regardless of angle estimation error, thus being more reliably and accurately estimated.

Further, in accordance with another embodiment of the present disclosure, inductance error used in control of a PMSM is a main factor to generate estimated angle deviation, and thus a method of detecting a magnitude of the inductance error includes injecting a signal having a frequency differing from the operating frequency of the PMSM, sensing a magnitude of current response to the injected signal, and estimating inductance at a point where the magnitude of current response is minimal, thereby raising an attenuation rate of a filter through signal analysis unrelated to phase delay of the filter and consequently effectively eliminating pulsating nose, thus improving accuracy and reliability in inductance estimation.

Moreover, in accordance with yet another embodiment of the present disclosure, although besides inductance used in control of a PMSM, information regarding other parameters, such as phase resistance and linked magnetic flux, are not accurate, inductance is estimated in a manner in which d-axis current is set to 0, thus being accurately estimated regardless of errors of the other parameters of the PMSM.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of estimating inductance of a permanent magnet synchronous motor (PMSM) comprising:
    injecting a random signal into one axis of a rotor coordinate system of the PMSM during sensorless operation;
    changing an inductance value used in control of the PMSM plural times during injection of the signal;
    respectively sensing current responses to the injected signal during change of inductance plural times; and
    detecting the inductance value based on magnitudes of the sensed current responses, and judging the detected inductance value to be an actual inductance value of the PMSM.

2. The method according to claim 1, wherein the injection of the random signal includes injecting a voltage signal.

3. The method according to claim 2, wherein the injection of the voltage signal includes injecting the voltage signal into the q-axis of the rotor coordinate system.

4. The method according to claim 3, wherein the sensing of the current responses includes sensing d-axis current responses to the voltage signal injected into the q-axis.

5. The method according to claim 1, wherein the detection of the inductance value based on the magnitudes of the sensed current responses includes:
- comparing the magnitudes of the sensed current responses to each other; and
- detecting an inductance value at which the magnitude of the sensed current response is minimal as a result of the comparison.

6. The method according to claim 1, wherein the injection of the random signal includes injecting a signal having a frequency differing from an operating frequency of the PMSM.

7. A method of estimating inductance of a permanent magnet synchronous motor (PMSM) comprising:
- injecting a random signal into one axis of a rotor coordinate system of the PMSM during sensorless operation;
- sensing change of current response to the injected signal while changing an inductance value used in control of the PMSM plural times during injection of the signal; and
- detecting an actual inductance value of the PMSM based on the sensed change of the current response.

8. The method according to claim 7, wherein the injection of the random signal includes injecting a voltage signal into the q-axis of the rotor coordinate system.

9. The method according to claim 8, wherein the sensing of the change of the current response includes sensing change of d-axis current response to the voltage signal injected into the q-axis.

10. The method according to claim 7, wherein the detection of the inductance value includes:
- detecting an inductance value used in control of the PMSM when the change of the current response is minimal; and
- judging the detected inductance value to be the actual inductance value of the PMSM.

11. The method according to claim 7, wherein the injection of the random signal includes injecting a signal having a frequency differing from an operating frequency of the PMSM.

12. An apparatus of estimating inductance of a permanent magnet synchronous motor (PMSM) comprising:
- an inverter to drive the PMSM;
- a current measurement unit to measure phase current of the PMSM; and
- an inductance estimation unit to inject a random signal into the axis of a rotor coordinate system of the PMSM during sensorless operation, change an inductance value used in control of the PMSM plural times during injection of the signal, respectively sense current responses to the injected signal during change of inductance plural times, detect the inductance value based on magnitudes of the sensed current responses, and judge the detected inductance value to be an actual inductance value of the PMSM.

13. The apparatus according to claim 12, wherein the inductance estimation unit injects the random signal into the axis of a rotor coordinate system of the PMSM during sensorless operation, changes inductance used in control of the PMSM plural times during injection of the signal, respectively senses current responses to the injected signal during change of inductance plural times, and detects an inductance value based on magnitudes of the sensed current responses, and judges the detected inductance value to be an actual inductance value of the PMSM.

14. The apparatus according to claim 13, wherein the inductance estimation unit compares the magnitudes of the sensed current responses to each other, detects an inductance value at which the magnitude of the sensed current response is minimal as a result of the comparison, and judges the detected inductance value to be the actual inductance value of the PMSM.

15. The apparatus according to claim 12, wherein the inductance estimation unit injects a voltage signal having a frequency differing from an operating frequency of the PMSM.

16. The apparatus according to claim 15, wherein the inductance estimation unit injects the voltage signal into the q-axis of the rotor coordinate system.

17. The apparatus according to claim 16, wherein the inductance estimation unit senses d-axis current responses to the voltage signal injected into the q-axis.

18. The apparatus according to claim 17, further comprising a band pass filter (BPF) to extract only d-axis current responses to the voltage signal injected into the q-axis.

19. The apparatus according to claim 18, further comprising a magnitude detector to detect a magnitude of the injected frequency signal for the d-axis current response.

20. The apparatus according to claim 12, further comprising an angle controller to estimate position and velocity of a rotating magnetic flux of the PMSM,
- wherein voltage and current applied to the PMSM is used as input of the angle controller, and
- the position and velocity of the rotating magnetic flux is estimated using the voltage, current and estimated inductance.

* * * * *